US008053498B2

(12) United States Patent
Wieland et al.

(10) Patent No.: US 8,053,498 B2
(45) Date of Patent: Nov. 8, 2011

(54) PULVERULENT POLYCONDENSATION PRODUCTS

(75) Inventors: Philipp Wieland, München (DE); Alexander Kraus, Evenhausen (DE); Gerhard Albrecht, Tacherting (DE); Harald Grassl, Schönau (DE); Kerstin Becher, Waldhausen (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 12/084,212

(22) PCT Filed: Dec. 18, 2006

(86) PCT No.: PCT/EP2006/012197
§ 371 (c)(1),
(2), (4) Date: Apr. 28, 2008

(87) PCT Pub. No.: WO2007/071361
PCT Pub. Date: Jun. 28, 2007

(65) Prior Publication Data
US 2009/0054558 A1 Feb. 26, 2009

(30) Foreign Application Priority Data

Dec. 20, 2005 (DE) .......................... 10 2005 060 947

(51) Int. Cl.
*C04B 24/26* (2006.01)
(52) U.S. Cl. ........................................................ 524/5
(58) Field of Classification Search ................ 524/5
See application file for complete search history.

(56) References Cited

U.S. PATENT DOCUMENTS

| 3,658,751 A | | 4/1972 | Grazen et al. | |
|---|---|---|---|---|
| 3,888,828 A | * | 6/1975 | Grossmann et al. | 525/505 |
| 4,001,379 A | * | 1/1977 | Turk et al. | 423/339 |
| 4,330,334 A | * | 5/1982 | Schaupp et al. | 524/6 |
| 4,707,508 A | | 11/1987 | Pieh et al. | |
| 5,475,220 A | * | 12/1995 | Hughes et al. | 250/339.09 |
| 5,750,634 A | | 5/1998 | Albrecht et al. | |
| 6,478,868 B1 | * | 11/2002 | Reddy et al. | 106/696 |
| 6,620,879 B1 | | 9/2003 | Albrecht et al. | |
| 6,864,344 B1 | | 3/2005 | Holland et al. | |
| 2003/0004246 A1 | | 1/2003 | Wache et al. | |

FOREIGN PATENT DOCUMENTS

| DE | 196 09 614 A1 | 9/1996 |
|---|---|---|
| DE | 199 46 591 A1 | 4/2001 |
| DE | 100 05 707 B4 | 10/2001 |
| EP | 0 221 301 A1 | 5/1987 |
| EP | 0 732 347 B1 | 9/1996 |
| EP | 0 780 348 A1 | 6/1997 |
| EP | 1 154 967 B1 | 11/2001 |
| GB | 1 391 358 A | 4/1975 |
| WO | WO 00/47533 | 8/2000 |
| WO | WO 2006/042709 A1 | 4/2006 |

OTHER PUBLICATIONS

Sipernat D11 Product Information.*

* cited by examiner

*Primary Examiner* — Milton I Cano
*Assistant Examiner* — John Uselding
(74) *Attorney, Agent, or Firm* — Fulbright & Jaworski L.L.

(57) ABSTRACT

Pulverulent polycondensation products are described, consisting of a) 5 to 95% by weight of a polycondensation product based on an aromatic or heteroaromatic compound (A) having 5 to 10 C atoms or heteroatoms having at least one oxyethylene or oxypropylene radical and one aldehyde (C) selected from the group consisting of formaldehyde, glyoxylic acid and benzaldehyde or mixtures thereof, and b) 5 to 95% by weight of a finely divided mineral carrier material having a specific surface area of 0.5 to 500 m$^2$/g (according to BET as specified in DIN 66 131).

The pulverulent polycondensation products according to the invention are outstandingly suitable in construction material mixtures in an amount of from 0.1 to 5% by weight, based on the weight of the construction material. The pulverulent polycondensation products have a number of advantages here, such as, for example, excellent storage stability, good liquefying action at low dosage and industrially simple production.

32 Claims, No Drawings

PULVERULENT POLYCONDENSATION PRODUCTS

RELATED APPLICATIONS

This application is a §371 of PCT/EP2006/012197 filed Dec. 18, 2006, which claims priority from German Patent Application No: 10 2005 060 947.3 filed Dec. 20, 2005.

The present invention relates to a pulverulent polycondensation product based on aromatic or heteroaromatic compounds, processes for its production, and its use as an additive for construction material mixtures.

Additives are often added in the form of dispersing agents to aqueous suspensions of pulverulent inorganic or organic substances, such as hydraulic binders (e.g. cement, lime, gypsum or anhydrite), rock flour, silicate flour, chalk, clays, porcelain slip, talc, pigments, carbon black or plastic powders, in order to improve their processability, i.e. kneadability, flowability, sprayability, spreadability or pumpability. By means of adsorption on the surface of the particles, these additives are able to break up agglomerates and to disperse the particles formed. This leads, in particular with highly concentrated dispersions, to a marked improvement in the processability.

This effect can be utilized particularly advantageously in the production of construction material mixtures which contain hydraulic binders such as cement, lime, gypsum or anhydrite, since for the achievement of a readily processable consistency significantly more water would otherwise be needed than would be necessary for the subsequent hydration process. Owing to the water gradually evaporating after hardening, cavities remain which significantly worsen the mechanical strengths and resistances of the construction articles.

In order to reduce the excessive-water content in the sense of hydration and/or to optimize the processability with a specified water/binder ratio, additives are employed which are in general designated as water reduction or flow agents.

Examples of cement dispersing agents or flow agents mainly used hitherto are salts of naphthalenesulphonic acid/formaldehyde condensates (cf. EP-A 214 412, in the following designated as naphthalenesulphonates), salts of melaminesulphonic acid/formaldehyde condensates (cf. DE-C 16 71 017, in the following designated as melaminesulphonates), and salts of polycarboxylic acids (cf. U.S. Pat. No. 5,707,445 B1, EP 1 110 981 A2, EP 1 142 847 A2, in the following designated as polycarboxylates). Such polycarboxylates are usually prepared by free-radical copolymerization of ethylenically unsaturated carboxylic acids (such as, for example, acrylic acid, methacrylic acid or maleic acid or their salts) and poly(alkylene oxides) having a polymerizable end group (such as, for example, methacrylates, allyl ethers or vinyl ethers). This manner of preparation leads to polymers having a comb-like structure.

Each of the dispersing agents mentioned has specific advantages, but nevertheless also individual disadvantages. Thus polycarboxylates, for example, show a marked retardation of the solidification times of concrete with, at the same time, excellent liquefying action. On the other hand, naphthalenesulphonates and melaminesulphonates show good liquefaction and the development of strength is scarcely affected by the addition of these substances. However, these liquefiers exhibit the problem of "slump loss", i.e. that the liquefying action is maintained only over a relatively short timespan even at comparatively high dosages. In particular, this then leads to problems if there are relatively large timespans between the preparation of the concrete and its incorporation, such as often results due to long transport or conveyor routes.

From various studies on the mechanism of action of flow agents, it is known that the effectiveness of the molecules used is based on two different effects. On the one hand, the negatively charged acid groups of the flow agents adsorb on the cement particle surface positively charged by calcium ions. The electrostatic bilayer resulting in this way (zeta potential) leads to an electrostatic repulsion between the particles which, however, is relatively weak. In the case of the abovementioned comb polymers, this electrostatic repulsion is additionally increased by the steric demand of the water-soluble, nonadsorbent, poly(alkylene oxides). This steric repulsion is very much larger than the electrostatic one, so it is easy to explain why the liquefying action of the polycarboxylates is very much larger than that of the naphthalene- or melaminesulphonates, i.e. in order to achieve a comparable liquefaction, the polycarboxylate can be markedly lower dosed.

One disadvantage of the polycarboxylates is that for their preparation poly(alkylene oxides) are necessary which must be functionalized with a polymerizable group in an extra reaction step. For this reason, the price of the preparation of these liquefiers is far above that of naphthalene- or melaminesulphonates, by which the always very high consumption of such liquefiers can be explained.

A polycondensation product which in addition to acid adhesive groups also contains nonadsorbent side chains is described in U.S. Pat. No. 5,750,634, the side chains being incorporated into the product by a copolycondensation of melaminesulphonic acids, formaldehyde and amino group-containing polyalkylene oxides. The disadvantage of this process, however, is on the one hand the high price of amino-functionalized polyalkylene oxides, on the other hand high degrees of polymerization are not achieved in this process, which adversely influences the activity of the polymers obtained in comparison to the abovementioned polycarboxylates. A further example of such a polycondensation product containing nonadsorbent side chains is described in EP 0 780 348 A1. Therein, ethoxylated phenol is subjected to a polycondensation reaction with hydroxybenzoic acids in the presence of formaldehyde. The reaction times described there of 10 to 12 h, however, are not very suitable for an economically useful industrial production. Moreover, hydroxybenzoic acids are relatively expensive and on account of their pulverulent consistency are significantly worse to meter on the industrial scale than, for example, liquids.

In the German Patent Application 10 2004 050 395.8, polycondensation products based on an aromatic or heteroaromatic compound (A) having 5 to 10 C atoms or heteroatoms having at least one oxyethylene or propylene radical and an aldehyde (C) selected from the group consisting of formaldehyde, glyoxylic acid and benzaldehyde or mixtures thereof are described which cause a liquefying action of inorganic binder suspensions comparable with comb-like polycarboxylates and maintain this effect over a relatively long period of time ("slump maintenance"). In comparison to condensation products based on naphthalenesulphonates or melaminesulphonates, these condensation products have a significantly better liquefying action with, at the same time, a lower dosage.

The disadvantage with these condensation products is only the fact that the corresponding polycondensation products are obtained in the form of aqueous solutions having a solids content of about 30% by weight, for whose storage, in particular in warm climatic zones, particular measures are necessary for their stabilization.

The present invention was therefore based on the object of making available appropriate polycondensation products which do not have the said disadvantages according to the prior art, but have an excellent liquefying action in construction material mixtures and at the same time have excellent storage stability.

This object was achieved according to the invention by the provision of pulverulent polycondensation products comprising or containing a) 5 to 95% by weight of a polycondensation product based on an aromatic or heteroaromatic compound (A) having 5 to 10 C atoms or heteroatoms containing at least one oxyethylene or oxypropylene radical and an aldehyde (C) selected from the group consisting of formaldehyde, glyoxylic acid and benzaldehyde or mixtures thereof, and b) 5 to 95% by weight of a finely divided mineral carrier material having a specific surface area of 0.5 to 500 m²/g (according to BET as specified in DIN 66 131).

A preferred embodiment of the invention is the provision of pulverulent polycondensation products consisting of a) 5 to 95% by weight of a polycondensation product based on an aromatic or heteroaromatic compound (A) having 5 to 10 C atoms or heteroatoms containing at least one oxyethylene or oxypropylene radical and an aldehyde (C) selected from the group consisting of formaldehyde, glyoxylic acid and benzaldehyde or mixtures thereof, and b) 5 to 95% by weight of a finely divided mineral carrier material having a specific surface area of 0.5 to 500 m²/g (according to BET as specified in DIN 66 131).

It has in fact surprisingly been shown that the preparation of these pulverulent polycondensation products can also be carried out without neutralization of the aqueous solutions, which is why no sodium sulphate, which can interfere under certain circumstances, is formed which optionally has to be removed again relatively laboriously.

Moreover, the polycondensation products proposed according to the invention can be produced in an industrially very simple manner, which was likewise unforeseeable.

The condensation product used for the preparation of the pulverulent products according to the invention consists of at most three components A), B) and C, where in some cases the use of component B) can be dispensed with. Component A) is an aromatic or heteroaromatic compound having 5 to 10 C atoms, this compound on average containing 1 to 300 moles of a radical from the group consisting of oxyethylene [—$CH_2$—$CH_2$—O—] and oxypropylene [—$CH(CH_3)$—$CH_2$—O— and/or (—$CH_2$—$CH(CH_3)$—O—)] per molecule, which is linked to the aromatic or heteroaromatic compound via an O or N atom. Such a radical can be a homogeneous compound, but is expediently a mixture of components whose number of oxyalkylene groups is different from two or three carbon atoms (i.e. oxyethylene and/or oxypropylene), where the chemical structure of the unit at the end of the oxyalkylene groups is in general identical and in some cases a mixture of chemically different aromatic compounds can also be used. The average number of oxyalkylene groups consisting of two or three carbon atoms per molecule which are contained in the components which yield such a mixture is 1 to 300, preferably 2 to 280 and particularly preferably 10 to 200.

According to a preferred embodiment, the aromatic or heteroaromatic compounds A) employed are phenol, naphthol, aniline or furfuryl alcohol derivatives. It is possible in the context of the present invention that component A) contains substituents selected from the group consisting of OH, $OR^1$, $NH_2$, $NHR^1$, $NR^1_2$, $C_1$-$C_{10}$-alkyl, $SO_3H$, COOH, $PO_3H_2$, $OPO_3H_2$, where the $C_1$-$C_{10}$-alkyl radicals can in turn have phenyl or 4-hydroxyphenyl radicals and $R^1$ is a $C_1$-$C_4$ alkyl radical. Actual examples of component A) are the adducts of phenol, cresol, resorcinol, nonylphenol, methoxyphenol, naphthol, methylnaphthol, butylnaphthol, bisphenol A, aniline, methylaniline, hydroxyaniline, methoxyaniline, furfuryl alcohol and salicylic acid with 1 to 300 moles of an oxyethylene and/or oxypropylene radical. From the point of view of a condensation with formaldehyde which can be carried out easily, component A) is preferably an adduct of a benzene derivative, e.g. phenol, which can contain a $C_1$-$C_{10}$-alkyl group, particularly preferably of phenol with an alkylene oxide. The aromatic starting component for A) can in some cases already contain one or more oxyalkylene groups having two or three carbon atoms, where in such a case the sum of the oxyalkylene groups, both of the starting substance and of the oxyalkylene groups added by an addition reaction, ranges from 1 to 300 per molecule.

Substances with which a poly(oxyalkylene) group can be introduced into the aromatic starting component for A) are ethylene oxide and propylene oxide. Addition can either take place in a random sequence or in the form of a block structure. The terminal unit of the poly(oxyalkylene) group of component A) is not restricted here to a hydroxyl group; it can in fact also consist of an alkyl ether or a carboxylic acid ester, as long as this group does not prevent the condensation with formaldehyde or the aldehyde-acid component.

Component B) is an aromatic compound selected from the group consisting of phenols, phenol ethers, naphthols, naphthol ethers, anilines, furfuryl alcohols and/or of an aminoplast former selected from the group consisting of melamine (derivatives), urea (derivatives) and carboxylic acid amides. According to a preferred embodiment, the aromatic compound B) contains substituents selected from the group consisting of OH, $NH_2$, $OR^2$, $NHR^2$, $NR^2R^2$, COOH, $C_1$-$C_4$-alkyl, $SO_3H$, $PO_3H_2$, $OPO_3H_2$, where the alkyl radicals can in turn have phenyl or 4-hydroxyphenyl radicals and $R^2$ is a $C_1$-$C_4$-alkyl radical or a (poly)oxy-$C_2$-$C_3$-alkylene radical (having 1 to 300 ethylene oxide and/or propylene oxide units), which for its part can have a substituent selected from the group consisting of OH, COOH, $SO_3H$, $PO_3H_2$, $OPO_3H_2$. Examples of these are phenol, phenoxyacetic acid, phenoxyethanol, phenoxyethanol phosphate, phenoxydiglycol, phenoxydiglycol phosphate, methoxyphenol, resorcinol, cresol, bisphenol A, nonylphenol, aniline, methylaniline, N-phenyldiethanolamine, N-phenyl-N,N-di propanoic acid, N-phenyl-N,N-diacetic acid, N-phenyldiethanolamine diphosphate, phenol-sulphonic acid, anthranilic acid, succinic acid monoamide, furfuryl alcohol, melamine and urea.

The third component C) is an aldehyde compound selected from the group consisting of formaldehyde, glyoxylic acid and benzaldehyde or mixtures thereof, where the benzaldehyde can additionally contain acid groups of the formulae $COOM_a$, $SO_3M_a$ and $PO_3M_a$ and M=H, alkali metal or alkaline earth metal, ammonium or organic amine radicals and a can be =½, 1 or 2. Generally, formaldehyde is used in combination with a further aldehyde which contains acid groups or their corresponding salts. It is also possible to carry out the polycondensation without the presence of formaldehyde. The presence of acid groups in at least one of the aldehyde components is preferred for the use of the polymers obtained as flow agents, as in this way adsorption of the polymers on the cement surface necessary for a liquefying action can be achieved. If, however, the acid group is introduced by means of a suitable component B), the use of acid group-containing aldehydes can also be dispensed with. Preferred aldehyde acid derivatives comprise aldehyde-carboxylic acids, -sulphonic acids and -phosphonic acids. Formaldehyde, glyoxylic acid, benzaldehydesulphonic acid or benzaldehydedisulphonic acid are particularly preferably used. As mono- or divalent salts of these aldehyde acid derivatives, preferably the alkali metal salts, e.g. sodium or potassium salts, alkaline earth metal salts, e.g. calcium salts, and also ammonium salts or salts of organic amines are used. According to a preferred embodiment, the ratio of formaldehyde to the aldehyde acid component is 1:0.1-100, in particular 1:0.5-50 and particularly preferably 1:0.5-20.

The aldehyde components are preferably employed in the form of their aqueous solutions, which considerably simplifies the dosage or mixing of the components in a synthesis to be carried out industrially; however, the use of the crystalline or pulverulent pure substances or their hydrates is also possible.

The molar ratio of the components A), B) and C) can be varied within wide limits, but it has proved to be particularly advantageous that the molar ratio of component C):A)+optionally B) is adjusted to 1:0.01 to 10, in particular 1:0.1 to 8 and the molar ratio of component A):B) to 10:1 to 1:10.

The appropriate condensation products and their preparation in aqueous solution are described in German Patent Application DE 2004 050 395.8.

It is to be regarded as essential to the invention that the finely divided mineral carrier materials used have a specific surface area of 0.5 to 500 $m^2/g$ (determined according to BET as specified in DIN 66 131). The proportions by weight of carrier materials in the pulverulent polycondensation products depend on the type, the composition and the incorporation form of the polycondensation product and on the specific surface area and the adsorption power of the mineral carrier material. They can therefore vary in a very wide range from 5 to 95% by weight.

The type of these carrier materials is subject to no particular restriction. It is essential that the material is readily compatible with the polycondensation product, does not adversely influence the action of this component and even in small amounts affords pulverulent agglutination- and baking-resistant polymer compositions.

Preferably, chalk, silicic acid, calcite, aluminium oxide, dolomite, quartz powder, bentonite, pumice flour, titanium dioxide, fly ash, cement (Portland cement, Portland blast-furnace cement, etc.) aluminum silicate, talcum, anhydrite, lime, mica, kieselguhr, gypsum, magnesite, clay, kaolin, slate and rock flour, barium sulphate and mixtures of these materials can be employed. According to a preferred embodiment, the mineral carrier material already comprises one or more mineral components of a construction material.

The finely divided carrier materials have a preferred particle size of 0.1 to 1000 μm.

Optionally, the mineral carrier materials can be used in combination with organic (non-mineral) additives such as cellulose powders or fibres and powders or fibres of organic polymers (polyacrylonitrile, polystyrene, etc.).

The invention also relates to a process for the production of the pulverulent condensation products, in which the polycondensation products are mixed with the carrier material in the form of a melt having a total water content of <10% by weight.

Furthermore, the mixing technique is of particular interest in the incorporation, which is oriented very strongly to the type of carrier material used.

Carrier materials having a marked porous structure, such as, for example, silicic acids, have a particularly high adsorption power.

Mixers on whose mixing tools high shear forces are active can destroy the porous structure, as a result of which the condensation products retained in the cavities are pressed out again. It is therefore recommended for this type of carrier to use mixers having low shear forces, such as drum mixers, vortex mixers, tumbler mixers or other representatives from the group of the gravity mixers.

Moreover, cone mixers, ploughshare mixers or spiral mixers having vertically or horizontally arranged mixing tools are suitable for porous carriers. For the mineral carriers whose structure cannot be damaged by the mixing process, all other types of apparatus are also utilizable, such as dissolvers, screw mixers, double screw mixers, air-mix mixers and others.

A further subject of the present invention is the use of the pulverulent condensation products in construction materials, the construction materials employed being bitumen products, construction materials based on hydraulically setting binders such as cement and latent hydraulic binders, gypsum-, anhydrite- or other calcium sulphate-based construction materials, ceramic compounds, refractory compounds, oilfield construction materials and dispersion-based construction materials.

The incorporation of the pulverulent polycondensation products into the building material is as a rule carried out together with other fillers and construction material additives such as dispersion powders, water retention agents, thickeners, retardants, accelerators, wetting agents and others. The content of pulverulent polycondensation products is customarily 0.1 to 5% by weight based on the weight of the construction material. The pulverulent polycondensation products according to the invention have a number of advantages such as, for example, great storage stability, good liquefying action at low dosage and industrially simple production, as the following examples verify.

EXAMPLES

A. Production of the Pulverulent Polycondensation Products

Example A-1

1 mole of poly(ethylene oxide) monophenyl ether (2000 g/mole), 1 mole of phenoxyethanol phosphate (or a mixture of 2-phenoxyethanol dihydrogenphosphate and 2-phenoxyethanol hydrogenphosphate), 0.6 mole of water and 2 moles of conc. $H_2SO_4$ are introduced with stirring. 2 moles of formaldehyde in the form of a 37% strength aqueous solution are added dropwise to the solution resulting in this way. The polycondensation reaction is completed at 105° C. over a period of 5 h. After completion of the reaction, basic aluminium oxide (particle size 0.05-0.15 mm) is slowly stirred into the liquid polymer melt without prior neutralization at about 80° C. until a loose powder results. The amount of aluminum oxide is chosen such that the proportion of polycondensation product to the carrier is 10% by weight.

Example A-2

1 mole of poly(ethylene oxide) monophenyl ether (2000 g/mole), 1 mole of phenoxyethanol phosphate (or a mixture of 2-phenoxyethanol dihydrogenphosphate and 2-phenoxyethanol hydrogenphosphate), 0.6 mole of water and 2 moles of conc. $H_2SO_4$ are introduced with stirring. 2 moles of form aldehyde in the form of a 37% strength aqueous solution are added dropwise to the solution resulting in this way. The polycondensation reaction is completed at 105° C. over a period of 5 h. After completion of the reaction, basic aluminium oxide (particle size 0.05-0.15 mm) is slowly stirred into the liquid polymer melt without prior neutralization at about 80° C. until a loose powder results. The amount of aluminum oxide is chosen such that the proportion of polycondensation product to the carrier is 20% by weight.

Example A-3

1 mole of poly(ethylene oxide) monophenyl ether (2000 g/mole), 1 mole of phenoxyethanol phosphate (or a mixture of 2-phenoxyethanol dihydrogenphosphate and 2-phenoxyethanol hydrogenphosphate), 0.6 mole of water and 2 moles of conc. $H_2SO_4$ are introduced with stirring. 2 moles of formaldehyde in the form of a 37% strength aqueous solution are added dropwise to the solution resulting in this way. The polycondensation reaction is completed at 105° C. over a period of 5 h. After completion of the reaction, Sipernat 360® (precipitated silicic acid, average particle diameter 15 μm, specific surface area 50 $m^2/g$) is slowly stirred into the liquid polymer melt without prior neutralization at about 80° C. until a loose powder results. The amount of Sipernat 360® is chosen such that the proportion of polycondensation product to the carrier is 30% by weight.

Example A-4

1 mole of poly(ethylene oxide) monophenyl ether (2000 g/mole), 1 mole of phenoxyethanol phosphate (or a mixture of 2-phenoxyethanol dihydrogenphosphate and 2-phenoxyethanol hydrogenphosphate), 0.6 mole of water and 2 moles of conc. $H_2SO_4$ are introduced with stirring. 2 moles of formaldehyde in the form of a 37% strength aqueous solution are added dropwise to the solution resulting in this way. The polycondensation reaction is completed at 105° C. over a period of 5 h. After completion of the reaction, Sipernat 360® (precipitated silicic acid, average particle diameter 15 μm, specific surface area 50 $m^2/g$) is slowly stirred into the liquid polymer melt without prior neutralization at about 80° C. until a loose powder results. The amount of Sipernat 360® is chosen such that the proportion of polycondensation product to the carrier is 60% by weight.

B. Mortar Tests for the Determination of the Water Reduction Power and Maintenance of the Flowability Over a Period of 60 Min Implementation of the tests took place as specified in DIN EN 1015-3
Cement: CEM I 42.5 R Karlstadt

TABLE 1

| Rilem mixer; cement: Karlstadt; S/C = 2.2; standard sand = 70%; Quartz sand = 30% | | | | Degree of spread of mortar | | |
|---|---|---|---|---|---|---|
| Example I | Flow agent | w/c | Dos. [%] | 0 min [cm] | 30 min [cm] | 60 min [cm] |
| A-0 | without | 0.55 | — | 24.7 | 23.9 | — |
| A-1 | 10% PC/90% $Al_2O_3$ | 0.47 | 0.2 | 24.6 | 25.6 | 24.6 |
| A-2 | 20% PC/80% $Al_2O_3$ | 0.47 | 0.2 | 24.1 | 24.8 | 24.5 |
| A-3 | 30% PC/70% Sip | 0.47 | 0.2 | 24.9 | 25.1 | 25.3 |
| A-4 | 60% PC/40% Sip | 0.47 | 0.2 | 24.5 | 24.8 | 24.2 |

Results of the mortar spread tests;
PC = polycondensation product;
Sip = Sipernat 360 ®;
dosages designate the amount of flow agent based on the cement weight From the results shown in Table 1 it is clearly evident that the polycondensation products applied to various inorganic carrier materials act very well as water reducers in mortar. In comparison to the mortar mixture without flow agents, the water requirement for the achievement of the same processability in the case of the polycondensation products applied to inorganic carrier materials is markedly lower. Moreover, the processability of the mortar mixture in the case of the polycondensation products applied to inorganic carrier materials is maintained over a markedly longer period of time than in the case of the flow agent-free mortar mixture. In addition, the type of carrier material used appears to have no influence on the effectiveness of the products. The liquefying action in the case of the highly porous Sipernat 360® is comparable with the action of flow agent which was applied to markedly less porous $Al_2O_3$.

C. Concrete Tests for the Determination of the Water Reduction Power and Maintenance of the Flowability Over a Period of 60 Min The implementation of the tests took place as specified in DIN EN 206-1, DIN EN 12350-2 and DIN EN 12350-5.
Cement: 320 kg CEM I 52.5 R Bernburger, temperature 20° C. The results are summarized in Table 2.

TABLE 2

| Example | Flow agent | w/c | Dos. [%] | 0 min [cm] | 10 min [cm] | 40 min [cm] | 60 min [cm] |
|---|---|---|---|---|---|---|---|
| A-0 | without | 0.48 | — | 18 | 17 | 9 | 7 |
| A-1 | 10% PC/90% $Al_2O_3$ | 0.42 | 0.24 | 19 | 19.5 | 14 | 7 |
| A-2 | 20% PC/80% $Al_2O_3$ | 0.42 | 0.24 | 19.5 | 19.5 | 16 | 7 |
| A-3 | 30% PC/70% Sip | 0.42 | 0.26 | 21.5 | 22 | 18 | 13 |
| A-4 | 60% PC/40% Sip | 0.42 | 0.26 | 22.5 | 22.5 | 18 | 15 |

Results of the concrete tests;
PC = polycondensation product;
Sip = Sipernat 360 ®;
dosages designate the amount of flow agent based on the cement weight In this test series, the water-cement ratio was chosen such that for all samples a uniform slump value of about 20 cm was achieved after completion of the mixing process. Here too, the very good liquefying action of the products according to the invention is clearly evident. The processability was also maintained over a markedly longer period in concrete than in the case of the mixture without additive.

The invention claimed is:

1. A pulverulent polycondensation product essentially comprising:
   a) 5 to 95% by weight of a polycondensation product comprising an aromatic or heteroaromatic ring compound (A), wherein said ring has from 5 to 10 atoms selected from the group consisting of carbon atoms and heteroatoms, wherein said aromatic or heteroaromatic ring compound (A) has at least one oxyethylene or oxypropylene radical bonded to said ring, a compound (B) which is selected from the group consisting of an aromatic compound and an aminoplast former; wherein the compound (B) contains a substituent selected from only the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical which can contain a substituent selected from the group consisting of OH, COOH, $PO_3H_2$ and $OPO_3H_2$; and
   at least one aldehyde (C) selected from the group consisting of formaldehyde, glyoxylic acid, benzaldehyde, benzaldehydesulphonic acid and benzaldehydedisulphonic acid, or a mixture thereof, and
   b) 5 to 95% by weight of a finely divided mineral carrier material having a specific surface area of 0.5 to 500 $m^2/g$ according to BET as specified in DIN 66 131.

2. A polycondensation product according to claim 1, wherein the aromatic or heteroaromatic ring compound (A) on average has 1 to 300 moles per molecule of at least one of an oxyethylene or oxypropylene radical, which is linked to the aromatic or heteroaromatic ring compound (A) via O or N atom.

3. A polycondensation product according to claim 1, wherein component (A) consists of a phenol, naphthol, aniline or furfuryl alcohol derivative.

4. A polycondensation product according to claim 1, wherein component (A) further comprises a substituent selected from the group consisting of OH, $OR^1$, $NH_2$, $NHR^1$, $NR^1_2$, $C_1$-$C_{10}$-alkyl, $SO_3H$, COOH, $PO_3H_2$, $OPO_3H_2$, wherein the $C_1$-$C_{10}$-alkyl radicals can have phenyl or 4-hydroxyphenyl radicals and $R^1$ is a $C_1$-$C_4$ radical.

5. A polycondensation product according to claim 1, wherein component (A) is derived from a compound selected from the group consisting of phenol, cresol, resorcinol, nonylphenol, methoxyphenol, naphthol, methylnaphthol, butylnaphthol, bisphenol A, aniline, methylaniline, hydroxyaniline, methoxyaniline, furfuryl alcohol and salicylic acid.

6. A polycondensation product according to claim 1, wherein compound (B) is selected from the group consisting of a phenol, a phenol ether, a naphthol, a naphthol ether, an anilines, a furfuryl alcohol melamine, a melamine derivative, urea, a urea derivative and a carboxylic acid amide.

7. A pulverulent polycondensation product consisting of
   a) 5 to 95% by weight of a polycondensation product comprising an aromatic ring compound (A), wherein said ring has from 5 to 10 carbon atoms and has at least one oxyethylene or oxypropylene radical bonded thereto, and at least one aldehyde (C) selected from the group consisting of formaldehyde, glyoxylic acid and benzaldehyde, and
   b) 5 to 95% by weight of a finely divided mineral carrier material having a specific surface area of 0.5 to 500 $m^2/g$ according to BET as specified in DIN 66 131; and
   c) a compound (B) selected from the group consisting of an aromatic compound and an aminoplast former, wherein the compound (B) contains a substituent selected only from the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical which can contain a substituent selected from the group consisting of OH, COOH, $PO_3H_2$ and $OPO_3H_2$; and wherein the aminoplast former is selected from the group consisting of melamine, a melamine derivative, urea a urea derivative and a carboxylic acid amide.

8. A polycondensation product according to claim 6, wherein the compound (B) contains a substituent selected from the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical.

9. A polycondensation product according to claim 7, wherein the compound (B) contains a substituent selected from the group consisting of OH, $NH_2$, $OR^2$, $NHR^2$, $NR^2R^2$, COOH, $C_1$-$C_4$-alkyl, $PO_3H_2$ and $OPO_3H_2$, wherein the alkyl radicals can in turn have phenyl and $R^2$ is a $C_1$-$C_4$-alkyl radical or a (poly)oxy-$C_2$-$C_3$-alkylene radical which can contain a substituent selected from the group consisting of OH, COOH, $PO_3H_2$ and $OPO_3H_2$.

10. A polycondensation product according to claim 1, wherein the compound (B) is selected from the group consisting of phenol, phenoxyacetic acid, phenoxyethanol, phenoxyethanol phosphate, phenoxydiglycol, phenoxydiglycol phosphate, methoxyphenol, resorcinol, cresol, bisphenol A, nonylphenol, aniline, methylaniline, N-phenyldiethanolamine, N-phenyl-N,N-dipropanoic acid, N-phenyl-N,N-diacetic acid, N-phenyldiethanolamine diphosphate, anthranilic acid, succinic acid monoamide, furfuryl alcohol, melamine and urea.

11. A polycondensation product according to claim 1, wherein compound (B) is selected from the group consisting of phenol, phenoxyacetic acid, phenoxyethanol, phenoxyethanol phosphate, phenoxydiglycol, phenoxydiglycol phosphate, methoxyphenol, resorcinol, cresol, bisphenol A, aniline, methylaniline, N-phenyldiethanolamine, N-phenyl-N,N-dipropanoic acid, N-phenyl-N,N-diacetic acid, N-phenyldiethanolamine diphosphate, anthranilic acid, succinic acid monoamide, furfuryl alcohol, melamine and urea.

12. A polycondensation product according to claim 1, wherein component (C) is benzaldehyde and contains an acid group of formula $COOM_a$, $SO_3M_a$ or $PO_3M_a$, and M is H, an alkali metal, an alkaline earth metal, ammonium or an organic amine radical, and a is ½, 1 or 2.

13. A polycondensation product according to claim 6, wherein the molar ratio of component (C):(A) is 1:0.01 to 10.

14. A polycondensation product according to claim 7, wherein the molar ratio of component (C):(A) is 1:0.01 to 10.

15. A polycondensation product according to claim 6, wherein the molar ratio of the components (A):(B) is 10:1 to 1:10.

16. A polycondensation product according to claim 7, wherein the molar ratio of the components (A):(B) is 10:1 to 1:10.

17. A polycondensation product according to claim 1, wherein the carrier material comprises at least one carrier material selected from the group consisting of chalk, silicic acid, aluminum oxide, calcite, dolomite, quartz powder, bentonite, pumice flour, titanium dioxide, fly ash, cement, aluminum silicate, talcum, anhydrite, lime, mica, kieselguhr, gypsum, magnesite, clay, kaolin, slate and rock flour, and barium sulphate.

18. A polycondensation product according to claim 1, wherein the mineral carrier material is used in combination with an organic additive.

19. A polycondensation product according to claim 1, wherein the carrier material has a particle size of 0.1 to 1000 μm.

20. A composition comprising a construction material additive or filler admixture and a polycondensation product according to claim 1, wherein the polycondensation product is present in an amount of from 0.1 to 5% by weight based on the weight of the composition.

21. A composition according to claim 20, wherein the construction material additive or filler admixture is at least one of bitumen product, a hydraulically setting binder gypsum, anhydrite, calcium sulphate-based material, a ceramic, a refractory compound, an oilfield construction material or a dispersion-based construction material.

22. A composition comprising a polycondensation product according to claim 1 and at least one of a dispersion powder, a water retention agent, a thickener, a retardant, an accelerator or a wetting agent.

23. A polycondensation product according to claim 6, wherein the molar ratio of component (C):[(A)+(B)] is 1:0.01 to 10.

24. A polycondensation product according to claim 7, wherein the molar ratio of component (C):[(A)+(B)] is 1:0.01 to 10.

25. A pulverulent polycondensation product consisting essentially of:
a) 5 to 95% by weight of a polycondensation product comprising an aromatic or heteroaromatic ring compound (A), wherein said ring has from 5 to 10 atoms selected from the group consisting of carbon atoms and heteroatoms, wherein said aromatic or heteroaromatic ring compound (A) has at least one oxyethylene or oxypropylene radical bonded to said ring (B) and an aromatic compound; wherein the compound (B) contains a substituent selected only from the group consisting of $OH$, $NH_2$, $OR^2$, $NHR^2$, $NR^2R^2$, $COOH$, $C_1$-$C_4$-alkyl, $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical which can contain a substituent selected from the group consisting of $OH$, $COOH$, $PO_3H_2$ and $OPO_3H_2$; and
an aldehyde (C) selected from the group consisting of formaldehyde, glyoxylic acid, benzaldehyde, or a mixture thereof, and
b) 5 to 95% by weight of a finely divided mineral carrier material having a specific surface area of 0.5 to 500 m$^2$/g according to BET as specified in DIN 66 131.

26. A pulverulent polycondensation product according to claim 1, wherein compound B is a phosphatized monomer.

27. A pulverulent polycondensation product according to claim 1, wherein compound (B) is phosphatized monoethoxy phenol.

28. A pulverulent polycondensation product according to claim 1, wherein compound B is phenol and $R^2$=$C_2$-alkyl.

29. A pulverulent polycondensation product essentially comprising:
a) 5 to 95% by weight of a polycondensation product comprising an aromatic or heteroaromatic ring compound (A), wherein said ring has from 5 to 10 atoms selected from the group consisting of carbon atoms and heteroatoms, wherein said aromatic or heteroaromatic ring compound (A) has at least one oxyethylene or oxypropylene radical bonded to said ring, a compound (B) which is selected from the group consisting of an aromatic compound and an aminoplast former; wherein the compound (B) contains a substituent selected only from the group consisting of $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical which can contain a substituent selected from the group consisting of $PO_3H_2$ and $OPO_3H_2$; and
an aldehyde (C) selected from the group consisting of formaldehyde, glyoxylic acid, benzaldehyde, benzaldehyde sulphonic acid or a mixture thereof, and
b) 5 to 95% by weight of a finely divided mineral carrier material having a specific surface area of 0.5 to 500 m$^2$/g according to BET as specified in DIN 66 131.

30. A pulverulent polycondensation product consisting essentially of:
a) 5 to 95% by weight of a polycondensation product comprising an aromatic or heteroaromatic ring compound (A), wherein said ring has from 5 to 10 atoms selected from the group consisting of carbon atoms and heteroatoms, wherein said aromatic or heteroaromatic ring compound (A) has at least one oxyethylene or oxypropylene radical bonded to said ring, (B) and an aromatic compound; wherein the compound (B) contains a substituent selected only from the group consisting of $PO_3H_2$ and $OPO_3H_2$, wherein the alkyl radicals can in turn have phenyl or 4-hydroxyphenyl radicals and $R^2$ is a $C_1$-$C_4$-alkyl radical or a (poly)oxy-$C_2$-$C_3$-alkylene radical which can contain a substituent selected from the group consisting of $PO_3H_2$ and $OPO_3H_2$; and
an aldehyde (C) selected from the group consisting of formaldehyde, glyoxylic acid, benzaldehyde, or a mixture thereof, and
b) 5 to 95% by weight of a finely divided mineral carrier material having a specific surface area of 0.5 to 500 m$^2$/g according to BET as specified in DIN 66 131.

31. A process for preparing a polycondensation product of claim 1, comprising mixing the polycondensation product with the carrier material in the form of a melt having a total water content of <10% by weight.

32. A process according to claim 31, wherein the mixing is performed with a low shear mixer and the carrier material has a porous structure.

* * * * *